No. 727,199. PATENTED MAY 5, 1903.
F. H. RICHARDS.
PLAYING BALL.
APPLICATION FILED SEPT. 17, 1902.
NO MODEL.
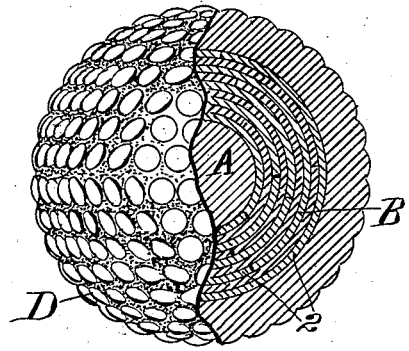
Witnesses: Inventor:

No. 727,199. Patented May 5, 1903.

UNITED STATES PATENT OFFICE.

FRANCIS H. RICHARDS, OF HARTFORD, CONNECTICUT, ASSIGNOR TO THE KEMPSHALL MANUFACTURING COMPANY, OF ARLINGTON, NEW JERSEY, A CORPORATION OF NEW JERSEY.

PLAYING-BALL.

SPECIFICATION forming part of Letters Patent No. 727,199, dated May 5, 1903.

Application filed September 17, 1902. Serial No. 123,791. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention relates to playing-balls, especially to those used in the game of golf; and its object is to provide at a low cost and by the use of a cheap material a ball possessing the triple qualities of "putting," "approach," and "long drive."

I have found that a golf-ball may be constructed partly or wholly of glue or like substance and that this material possesses that degree of resilience, as well as other requisites, which enables me to attain the objects of this invention.

In the drawings, Figure 1 illustrates the completed ball partly broken away to disclose its construction; Fig. 2, the manner in which the cup-layers are preferably applied one upon the other to form the core; and Fig. 3 illustrates, on an enlarged scale, the adhesion one to another of the layers of glue.

Similar characters of reference designate like parts throughout the drawings.

Upon some suitable center piece A, I apply layers of glue, which layers in the present instance constitute previously-formed hard hemispherical segments or cups 2, which are made into various sizes, so that they will fit one upon the other when applied to the center piece. As shown in the various figures, I also prefer that these cups 2 will be so applied one to the other in the formation of the core B that the joints between the various cups will be staggering with relation to each other, so that when the ball is completed one glue layer will reinforce the joint between other layers, thereby establishing solidity and stability throughout the core structure. To the core B thus formed I apply a layer of fibrous material C—such as leather, paper, or asbestos—which serves as a non-conducting layer for use particularly in the manufacture of the ball. The shell D, which may be made of any suitable material—such as gutta-percha, celluloid, or the like—is preferably applied to the core in hemispherical segments by being welded together under heat and pressure. By the use of said non-conducting layer C that heat which would injure the core B is checked. Sufficient heat, however, reaches the core to permit or cause the layers or cups 2 to become partially united, as indicated at 3 in Fig. 3. This partial adhesion or welding creates solidity in the core, whereby the mobility and resilience of each individual cup or layer are imparted to the other, and thus are these conditions combined throughout the entire core structure. While I have illustrated these cups or layers as being applied to a center piece, it is obvious that I may, if desirable, form the entire core of various-sized cups without the use of a center piece and also that other variations and modifications may be resorted to in attainment of the objects herein specified without departing from the spirit or design of the invention.

Various kinds of glue may be used in the ball, and the same may be treated in any desired manner to create the required action to produce the qualities of putting, approach, and long drive, and any condition into which said cups will be placed for the use desired will be maintained against atmospheric conditions by the sealing of the same within the welded impervious shell.

Having described my invention, I claim—

1. A playing-ball having a substantial sphere of hard glue, and a hard but springy shell inclosing said core.

2. A playing-ball comprising a substantially solid hard glue core, and a plastic shell compressed upon said core.

3. A playing-ball comprising a center piece, a thick substantially solid layer of hard glue thereon, and a shell inclosing said layer.

4. A playing-ball comprising a center piece, a substantially solid layer of glue thereon, a shell of plastic material inclosing said layer, and an intervening layer of heat-non-conducting material between said glue layer and shell.

5. A playing-ball comprising a hard center piece, a substantially solid layer of glue applied thereto, a shell of gutta-percha inclosing said layer, and a layer of fibrous material intervening between said glue layer and shell.

6. A playing-ball comprising a hard center piece, a substantially solid layer of glue applied thereto, a shell of gutta-percha inclosing said layer, and a layer of paper intervening between said glue layer and shell.

7. A playing-ball having a core built up partially of hard cups of glue, and a shell of gutta-percha compressed upon said core.

8. A playing-ball having a core partially built up of hard cups of adhesive material, and a shell of plastic material holding said core under compression.

9. A playing-ball having a core partially built up of hard cups of adhesive material all being consolidated together under heat and pressure, and a shell of plastic material compressed on said core.

10. A playing-ball having a hard center piece; cups of adhesive material applied to said center piece miscellaneously so that the various joints between the cups will stagger, and a shell of plastic material holding said cups under compression.

11. A playing-ball comprising a hard center piece, hemispherical layers of adhesive material applied thereto in miscellaneous directions so that the joints between each layer will be staggering, and a shell of plastic material compressed on said layers.

12. A playing-ball comprising a core composed of layers of hard glue, and a shell of plastic material upon said core.

13. A playing-ball comprising a core composed of layers of glue, and a shell of gutta-percha upon said core.

FRANCIS H. RICHARDS.

Witnesses:
B. C. STICKNEY,
F. W. BARNACLO.